May 17, 1927. 1,629,235
A. T. STURT ET AL
MUFFLER AND MOTOR VEHICLE FRAME
Filed Jan. 27, 1922 2 Sheets-Sheet 2
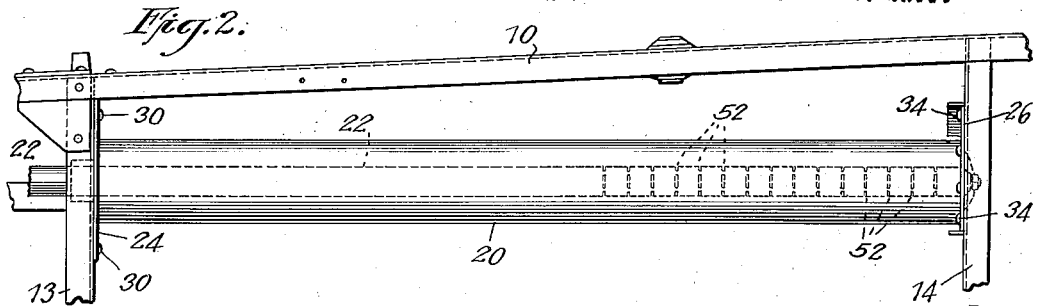
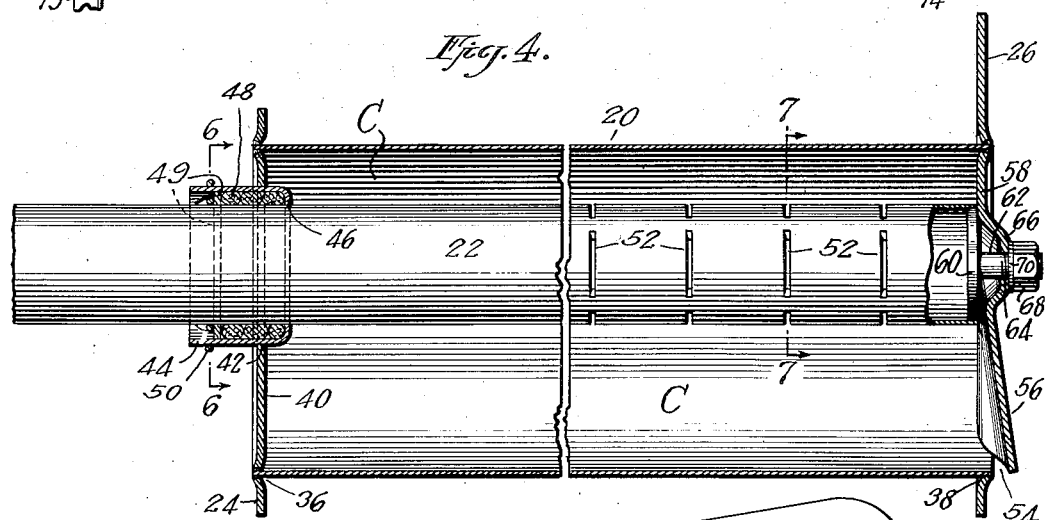
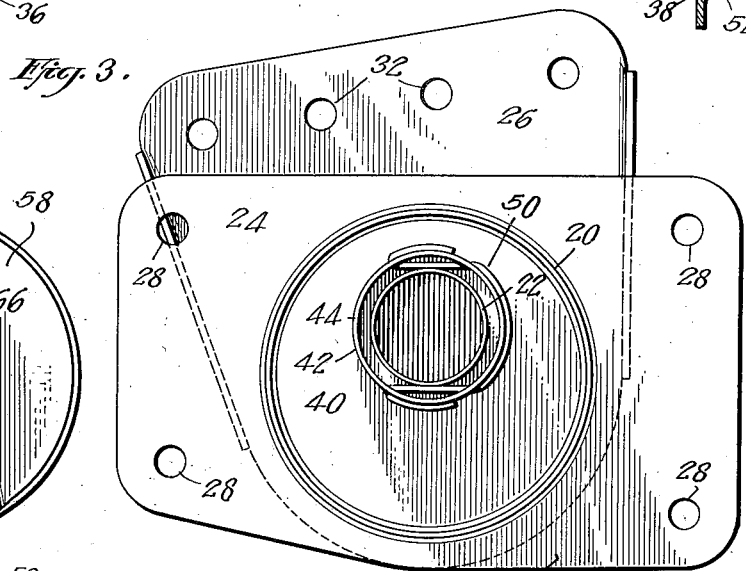
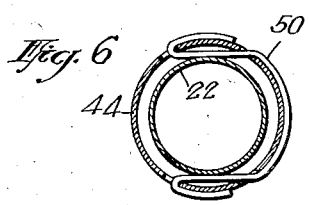
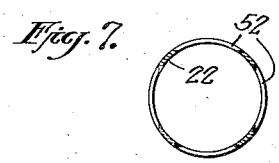
INVENTORS
Alfred T. Sturt
BY Walter F. Pfander
Cornelius C. Billings
their ATTORNEY Patented May 17, 1927.

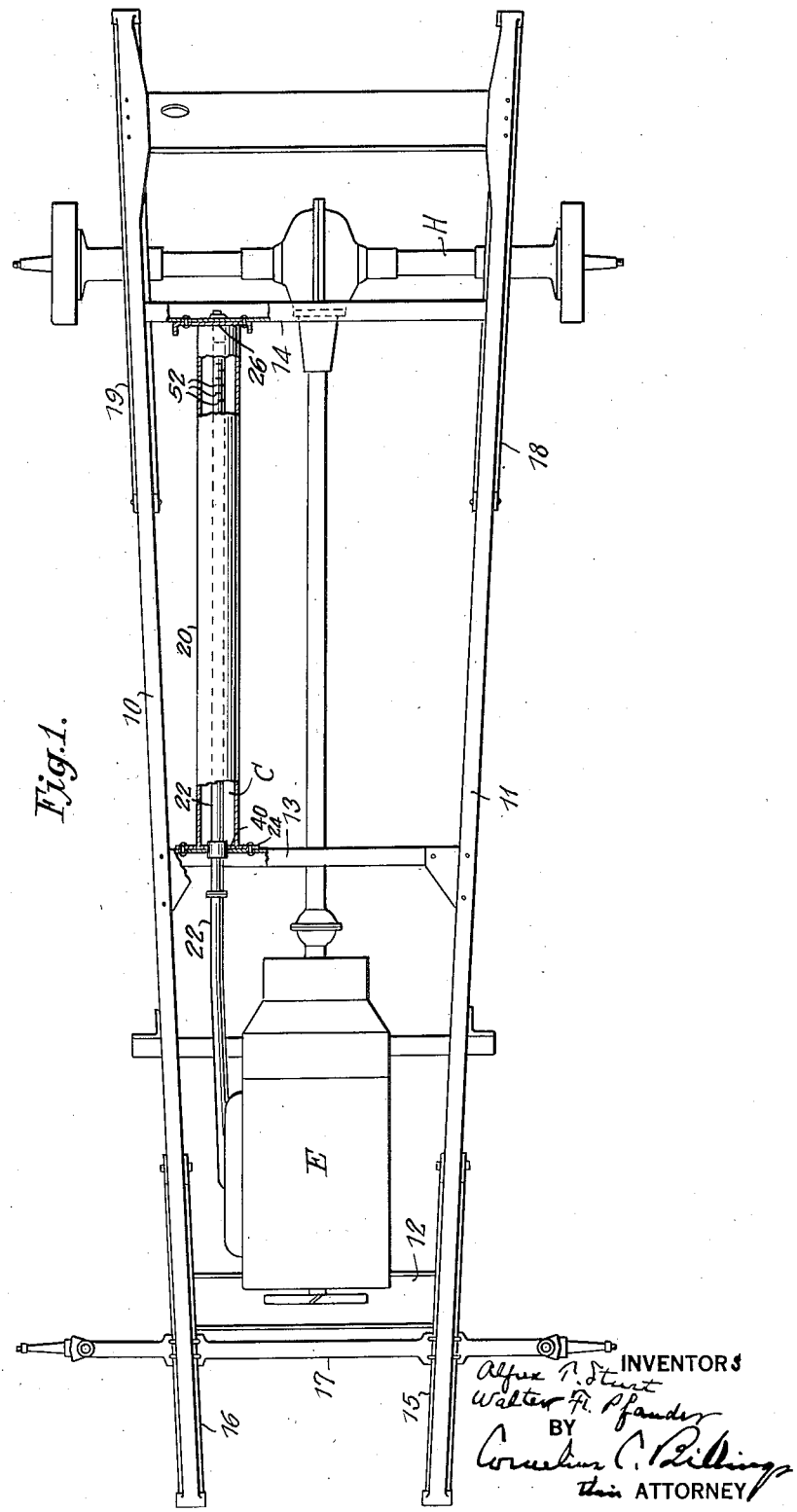

1,629,235

UNITED STATES PATENT OFFICE.

ALFRED T. STURT, OF FLINT, MICHIGAN, AND WALTER F. PFANDER, OF YONKERS, NEW YORK, ASSIGNORS TO DURANT MOTORS INCORPORATED, A CORPORATION OF DELAWARE.

MUFFLER AND MOTOR VEHICLE FRAME.

Application filed January 27, 1922. Serial No. 532,199.

Our invention relates to means for silencing the exhaust from internal combustion engines commonly known as a muffler, incorporated in the frame construction so that the torsional stresses thereon are effectively counteracted. The present application is a continuation of our prior application, Serial No. 461,847, filed April 16, 1921.

In the ordinary type of vehicle frame there is very little resistance offered to twisting or torsional strains received in passing over a rough or uneven road since the torsional displacements of the warping of the frame are distributed so that a considerable distortion of the frame causes but a slight twisting or bending of the individual beams of the frame. These beams such as the usual channel or I beams are well adapted to resist vertical bending stresses but are not adapted to resist torsional stresses. Accordingly, a large part of the jars which should be received and entirely taken up by the springs are transmitted to the chassis of the vehicle and cause its gradual weakening or destruction.

An object of the present invention is to provide a stiffening means for vehicle frames adapted to receive and resist the torsional stresses of the frame.

Another object of the invention is to provide a vehicle frame stiffened to resist torsional displacements.

A further object of the invention is to provide a muffler for the exhaust gases adapted and arranged on a vehicle frame to receive and resist the torsional stresses of the frame.

Another object is to provide a structure by means of which the area of the exhaust is enlarged, thereby avoiding the undesirable effects due to a single exhaust orifice.

Another object is to provide an improved outlet construction for the torsional tube forming the chamber within which the exhaust pipe is mounted.

Other objects will appear from the subjoined specification and claims.

Referring to the drawings in which the same reference character indicates the same part in the several views:

Fig. 1 is a plan view of an automobile chassis or frame illustrating our improved invention mounted thereon.

Fig. 2 is a plan of a portion of the chassis of a motor vehicle showing on a larger scale the muffler and tortional tube secured to the cross bars of the chassis.

Fig. 3 is a front elevation still further enlarged of the muffler detached from the chassis.

Fig. 4 is an enlarged longitudinal section, with parts in elevation and parts broken away, of the muffler assembly embodying our invention, shown detached from the chassis.

Fig. 5 is a detail rear elevation of a portion showing the structure of the plate forming the outlet or discharge orifice.

Figs. 6 and 7 are detailed sections taken respectively on lines 6—6 and 7—7 of Fig. 4.

In the present invention the stiffening means is rigidly mounted on or between two members, as, for example, two cross beams, which are torsionally displaced relatively to each other when the frame is distorted. The stiffening means is of such a construction that it offers a very large resistance to torsional stresses, a pipe or tube of sufficiently large diameter being suitable for this purpose. This pipe may also serve as a casing or part of a muffler for the exhaust gases from the engine. Since a tube of this type can not be twisted even slightly without a very great torsional stress and the tube is rigidly connected to members receiving the full displacement of the cross beams, all distortion of the frame is eliminated.

The provision of this auxiliary member rigidly holds the torsional members to which it is secured in true parallel relation through the high torsional resistance of its cylindrical or tubular form, and consequently also holds the longitudinal members in parallel relation to each other.

The torsional member being hollow and being properly situated for the purpose can also be effectively used as a sound deadening device or muffler for the engine. When this use is made of the member, heads are secured in the ends of the tube, these heads being formed with openings for the reception of the exhaust pipe from the engine and the final exhaust. Suitable sound deadening devices can be placed inside the tube if desired, or left out entirely.

If the tube be large in size the metal from which it is constructed can be thin, and the deflections will be small in proportion to the amount of metal used.

Referring to the drawings, the supporting frame comprises the usual longitudinal side members 10 and 11, the cross members 13 and 14 together with the cross member 12 each of which is riveted or otherwise secured the one to the other.

The frame is suitably supported in front on the springs 15 and 16 connected to the front axle 17 and in the rear by springs 18 and 19 on the rear axle housing H.

In the embodiment of the invention shown in the drawings the stiffener or torsion resisting element comprises a tube 20, which also serves as the outer casing of a muffler, and is secured to the cross members 13 and 14 by means of a front end plate and a rear end plate 58 welded or otherwise secured thereto, and by securing plates 24 and 26. The outer shell thus formed is provided with an inner conduit 22 connected to the engine E as well understood.

The front end plate 24 is drilled at 28 near each corner for the reception of the rivets 30 by which it is secured to the cross member 13 of the chassis. The rear plate 26 is provided with a series of holes 32 through which pass rivets 34 to secure it to the cross member 14. The end plates 24 and 26 are formed with annular depressions 36 and 38 forming seats in which the ends of the cylindrical casing 20 are welded, preferably by electric or gas welds.

A front head plate 40 is welded to the front end of the muffler tube 20 and is provided with an opening 42 in which is secured a sleeve 44. The inner end of said sleeve is flanged inwardly at 46 to fit the conduit 22. A packing 48 is held between the conduit 22 and the sleeve 44 by a washer 49 which is secured in place by a key wire 50 which is threaded through suitable apertures formed in the said sleeve, as shown in Fig. 6. This construction effects a tight joint and prevents leakage of the exhaust gases around the side of the conduit 22 which conduit is connected to or forms a continuation of the exhaust manifold of the internal combustion engine E carried by the chassis.

The conduit is kerfed or drilled near its rear portion at short intervals to form a multiplicity of outlet ports 52 for the exhaust gases. These outlet ports are placed at intervals for a distance of about one third the length of the conduit dependant upon requirements.

The exhaust gases thus escape into the chamber C within the shell 20 where they expand and finally escape to atmosphere through a port 54 which is formed by means of a flared portion or lip 56 which is raised or struck up from the head 58 which is welded or otherwise suitably secured to the rear end of the tube 20 and thus closes the rear end of the chamber C, leaving open the port 54 leading to atmosphere.

The rear end of the conduit 22 is supported by a disc-like fitting 60 having a rearwardly extending shank 62 which passes through a suitable hole 64 formed in a boss 66 struck up from the head 58. A nut 68 and a lock washer 70 are provided to securely hold said fitting in place.

The above described muffler is simple in construction, comparatively inexpensive to manufacture and serves also as a stiffener against torsional strains for the chassis by which it is carried, the multiplicity of outlets in the conduit 22 permitting the exhaust gases to escape into the chamber C without causing undue back pressure on the engine.

The case 20 is considerably longer than the mufflers used prior to our invention and is of such volume that the rapidly expanding exhaust gases expend most of their force therein and consequently the sound is deadened and the gases are discharged through the port 54 in silence.

As changes of construction could be made within the scope of our invention, it is intended that all matter contained in the above description or shown in the accompanying drawings shall be interpreted as illustrative and not in a limiting sense.

Having now described our invention, what we claim as new and desire to secure by Letters Patent is:

1. A combined frame stiffener and muffler comprising an outer elongated shell, a front head, an inner conduit extending through said front head and having a multiplicity of holes formed therein through which the exhaust gases escape to the chamber formed by said outer shell, means for preventing the escape of gas between said conduit and said front head, a rear head having a lip formed therein through which the exhaust escapes to atmosphere, means for rigidly securing said shell to cross members of a vehicle frame to prevent any relative movement therebetween, and means carried by said rear head for supporting the rear end of said conduit.

2. A combined frame stiffener and muffler comprising an elongated outer shell, front and rear heads secured to said shell, front and rear plates secured to said shell in juxtaposition to said front and rear heads and arranged to be secured to cross members of a chassis to support the muffler, a conduit for carrying exhaust gases to the interior of said shell, means carried by the front head for supporting the front of said conduit, and means for preventing the escape of gases between said conduit and said front head, means carried by said rear head for supporting the rear of said conduit, said rear head having an exhaust port formed therein.

3. In combination with the cross members of an automobile chassis, an elongated shell adapted to serve as a stiffener for said chassis, plates secured to said shell and said cross members, front and rear heads closing the ends of said shell, and an exhaust conduit extending into said shell and provided with ports through which gases are exhausted, means carried by said heads for supporting said conduit, said rear head having an exhaust passage formed therein.

4. A combined frame stiffener and muffler comprising an outer elongated shell, a front head, an inner conduit extending through said front head and having a multiplicity of holes formed therein through which the exhaust gases escape to the chamber formed by said outer shell, means for preventing the escape of gas between said conduit and said front head, means for securing said shell with absolute rigidity to cross elements of a frame, and a rear head having a lip formed therein through which the exhaust escapes to the atmosphere.

5. In combination with the cross members of an automobile chassis, an elongated shell adapted to serve as a stiffener for said chassis, front and rear heads closing the ends of said shell and an exhaust conduit extending into said shell and provided with ports through which gases are exhausted and means for securing said shell to said cross members through a connection substantially integral with said shell.

6. A device of the type described which comprises an outer elongated shell, a front head, an inner conduit extending through said front head and having a multiplicity of holes formed therein through which the exhaust gases escape to the chamber formed by said outer shell, means for preventing the escape of gas between said conduit and said front head, a rear head having a lip formed therein through which the exhaust escapes to the atmosphere, means for securing said shell to cross members of a frame with absolute rigidity, a closure for said inner conduit having a shank extending through said rear head, and a nut threaded on the projecting portion of said shank and removable to permit the removal of said inner conduit through said front end.

In witness whereof we have hereunto set our hands at 560 Jackson Ave., Long Island City, county of Queens, State of New York, this 24th day of January, 1922.

ALFRED T. STURT.
WALTER F. PFANDER.